Feb. 28, 1967   R. R. REID   3,306,452
WATER CONDITIONING SYSTEM
Filed June 5, 1963   3 Sheets-Sheet 1
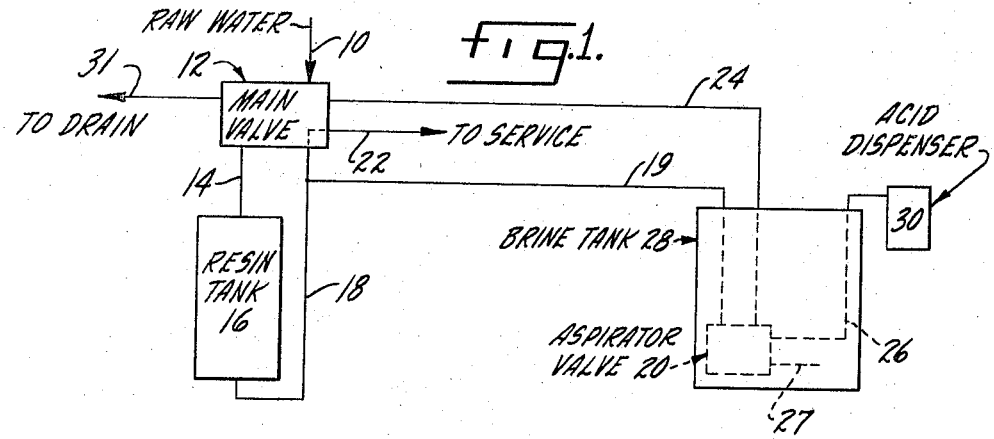
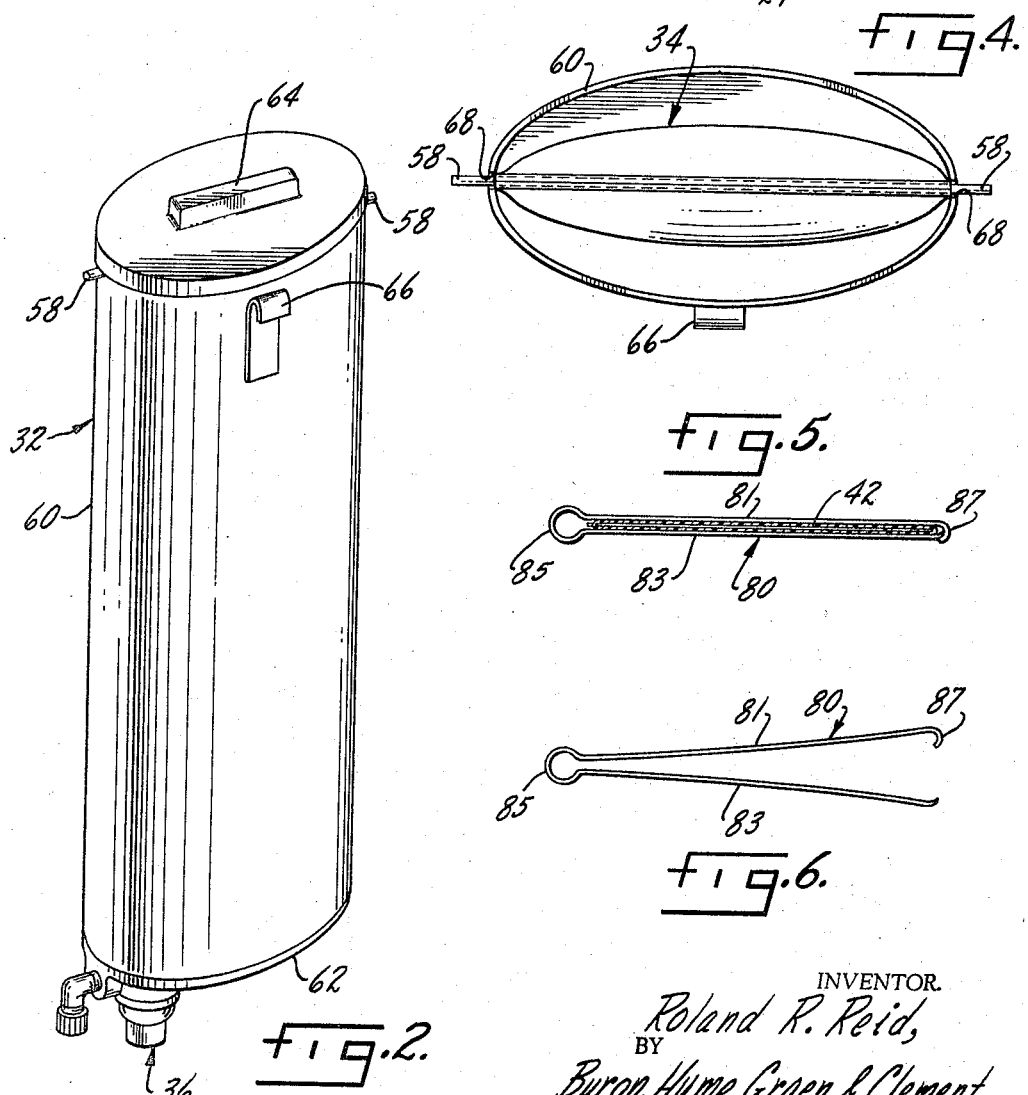
INVENTOR.
Roland R. Reid,
BY Byron, Hume, Groen & Clement
Attorneys.

Feb. 28, 1967  R. R. REID  3,306,452
WATER CONDITIONING SYSTEM
Filed June 5, 1963  3 Sheets-Sheet 3
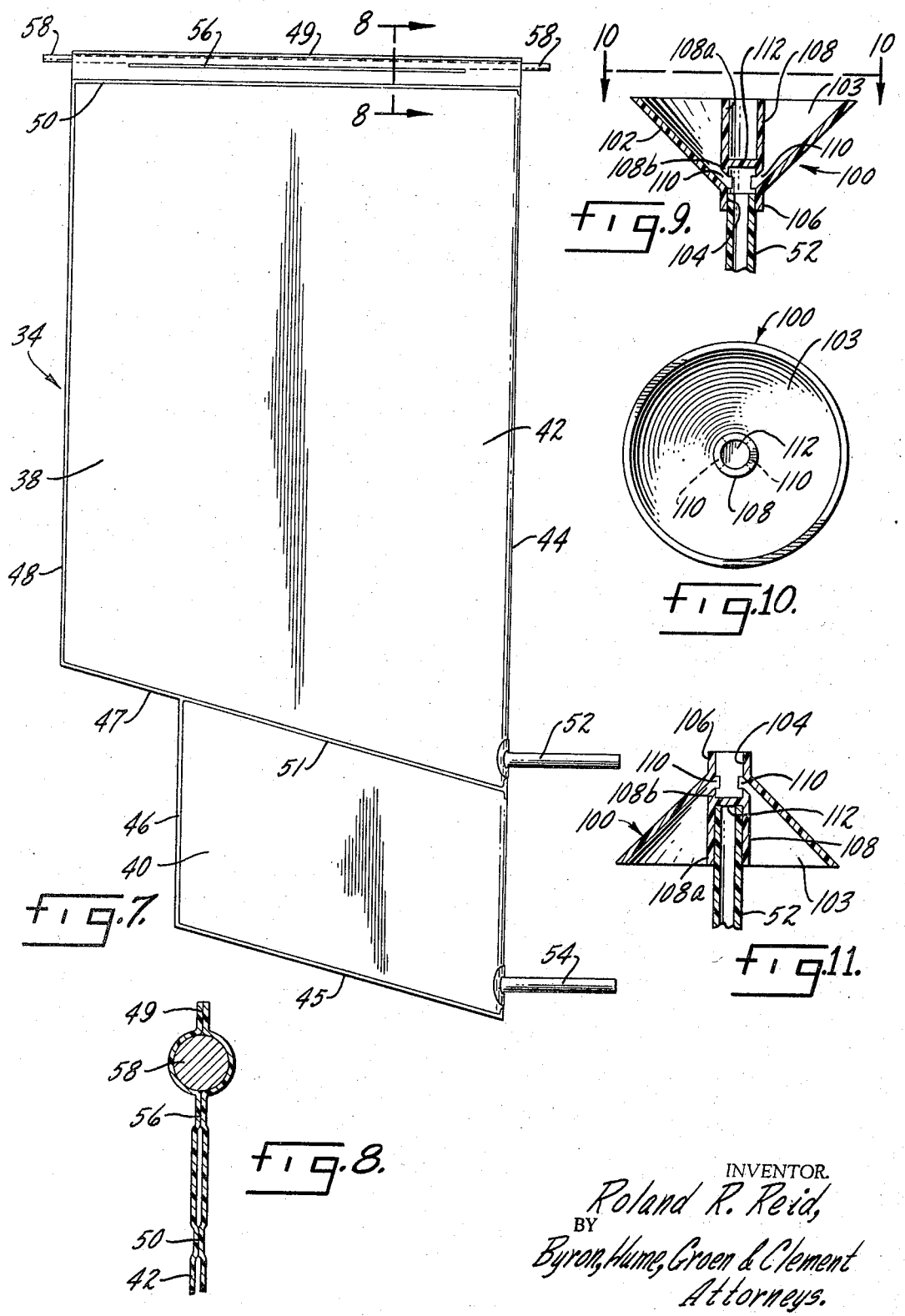
INVENTOR.
Roland R. Reid,
BY Byron, Hume, Groen & Clement
Attorneys.

United States Patent Office 3,306,452
Patented Feb. 28, 1967

3,306,452
WATER CONDITIONING SYSTEM
Roland R. Reid, White Bear Lake, Minn., assignor to Union Tank Car Company, Chicago, Ill., a corporation of New Jersey
Filed June 5, 1963, Ser. No. 285,822
5 Claims. (Cl. 210—136)

This invention relates to means for dispensing a liquid and, more particularly, to an acid dispenser for a water softening system.

Water softening with ion exchange resin particles is well known in the art. After prolonged contact of the ion exchange resin particles with raw water, these resin particles become "exhausted," i.e., their ability to exchange soft ions for the hard ions in the raw water is substantially diminished. When the ion exchange resin particles become exhausted, they must be regenerated. Heretofore, regeneration has been effected by contacting the resin particles with a brine solution, e.g., an aqueous solution of sodium chloride. More recently, it has been found that improved regeneration of the ion exchange resin particles is achieved by contacting the resin particles with an aqueous acid solution, such as citric acid or the like, and a brine solution. A sequential process may be employed wherein the resin particles are contacted first with the acid solution and then the brine solution. Likewise, the resin particles may be simultaneously contacted with the acid solution and the brine solution. These processes are discussed in detail in copending application Serial No. 170,043, filed January 31, 1962, now abandoned, and assigned to the assignee of the present application. In any event, such processes require means to dispense the aqueous acid solution which is to be contacted with the resin particles during the regeneration cycle.

Accordingly, it is an object of the present invention to provide a means for dispensing a liquid.

It is another object of the present invention to provide a means for dispensing a predetermined amount of liquid.

It is a further object of the present invention to provide a liquid dispenser adapted to dispense a predetermined amount of a liquid to a line, the liquid dispenser being actuated by the pressure in the line.

It is still another object of the present invention to provide means for dispensing a predetermined amount of an aqueous acid solution.

It is a still further object of the present invention to provide a liquid cartridge means for a liquid dispenser.

It is yet another object of the present invention to provide for a liquid dispenser a liquid cartridge means and a container means therefor.

It is a further object of the present invention to provide a liquid dispenser adapted to utilize replaceable liquid cartridge means.

It is another object of the present invention to provide means for filling a liquid cartridge means.

These and other objects more apparent hereinafter are realized by the liquid dispenser embodying the features of the present invention. The liquid dispenser utilizes a liquid cartridge means which stores and meters the liquid to be dispensed to a line to which the liquid dispenser is attached. The liquid cartridge means is mounted in a container means in such a manner that it may be easily replaced with another liquid cartridge means when its liquid supply has been exhausted.

The invention, both as to its organization and method of operation, taken with further objects and advantages thereof, will be understood by reference to the following description taken in conjunction with the accompanying drawings, in which:

FIGURE 1 is a schematic diagram of a water softening system wherein water is treated with ion exchange resin particles which are regenerated by an acid solution and a brine solution, the acid solution being supplied from an acid dispenser embodying the features of the present invention;

FIGURE 2 is a perspective view of an acid dispenser of FIGURE 1 embodying the features of the present invention;

FIGURE 4 is a top view of the acid dispenser of FIGURE 1 taken along line 4—4 of FIGURE 3;

FIGURE 5 is a cross-sectional view of the acid dispenser of FIGURE 1 taken along line 5—5 of FIGURE 3, illustrating a spring-clip means embodying the features of the present invention;

FIGURE 6 is a top view of the spring-clip means shown in FIGURE 5 when the spring-clip means is open;

FIGURE 7 is a side view of the liquid cartridge means of FIGURE 3;

FIGURE 8 is a fragmentary cross-sectional view of the liquid cartridge means taken along line 8—8 of FIGURE 7.

FIGURE 9 is a cross-sectional view of a funnel means embodying the features of the present invention;

FIGURE 10 is a top view of the funnel means taken along line 10—10 of FIGURE 9; and FIGURE 11 is a cross-sectional view of the funnel means of FIGURE 9, when the funnel means is employed as a cap.

Figure 3:
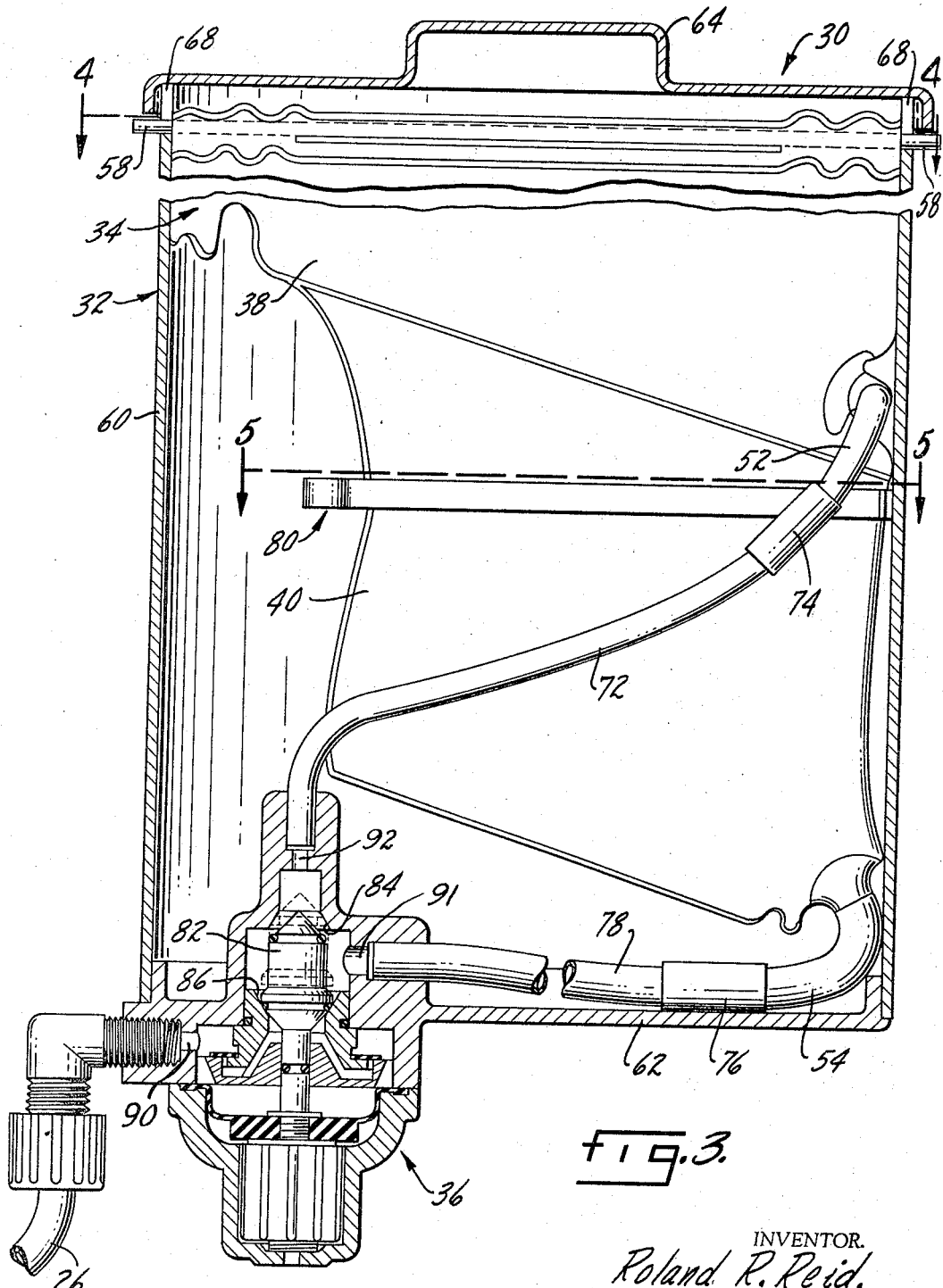
FIGURE 3 is a cut-away view of the acid dispenser of FIGURE 1 exposing a liquid cartridge means embodying the features of the present invention mounted therein.

Referring to the drawings, and more particularly to FIGURE 1, there is schematically illustrated a water softening system for treating water with ion exchange resin particles. Suitable ion exchange resin particles are well known in the art and do not constitute a part of the present invention. In this system the ion exchange resin particles, when they become exhausted, are regenerated with an acid solution and a brine solution.

During the service cycle, raw water from a suitable source is passed through a feed line 10 to a main valve indicated generally by reference numeral 12. The main valve 12 directs the raw water through a line 14 to a resin tank 16 which contains a bed of the ion exchange resin particles as is well known in the art. The raw water passes through the bed of ion exchange resin particles and is withdrawn from the tank 16 through a line 18. The treated water, which has been softened by contact with the ion exchange resin particles, passes through the line 18 to the main valve 12 which diverts it to a service line 22. There is, of course, no mixing of the treated water with the raw water in the main valve 12.

After a predetermined quantity of raw water has passed through the resin tank 16, the ion exchange resin particles lose their capacity to effectively soften the raw water and must be regenerated. This is effected by simultaneously contacting the exhausted resin particles with an acid solution and a brine solution. The regeneration cycle is initiated by actuating the main valve 12 so that a portion of the raw water from the line 10 is directed to the service line 22. In this manner, a supply of water is maintained to the service line 22 during the regeneration cycle. The remainder of the raw water is directed by the main valve 12 through a line 24 into an aspirator valve 20. As the raw water passes through the aspirator valve 20 in this direction a partial vacuum, i.e., a pressure less than atmospheric pressure, is created therein and in lines 26 and 27 which communicate with the aspirator valve 20. The line 27 communicates with the interior of a brine tank 28 in which the aspirator valve 20 is suitably mounted. The line 27 communicates with an acid dispenser 30 embodying the features of the present invention. By virtue of the partial vacuum or low pressure created in the lines 27 and 26, a brine solution is drawn from the brine tank 28 and a predetermined amount of acid solution is drawn from the acid dispenser 30, respectively. The acid solution and the brine solution enter the aspirator valve 20 and pass through a line 19 to the line 18 and into the tank 16. Suitable valve means (not shown) prevent acid and brine solution from passing directly from the line 18 into the main valve 12. After passing upwardly through the bed of resin particles in the tank 16, and thereby regenerating the resin particles, the acid solution and brine solution are passed to drain through a line 31 after passing through the line 14 and the main valve 12. The main valve 12 prevents the raw water from mixing with the brine solution and acid solution. Likewise, the acid and brine solution cannot enter the service line 22.

When the regeneration of the resin particles in the tank 16 is complete, the regeneration cycle is terminated by actuating the main valve 12 so that the raw water passes through the line 14, the tank 16, the line 18, the main valve 12, and the service line 22, as discussed hereinbefore. During the service cycle some of the treated water passes through the line 19 and the aspirator valve 20 to the line 27 to supply make-up water to the brine tank 28, as is well known in the art. The line 27 has suitable valve means (not shown) to automatically terminate the flow of make-up water to the brine tank 28 after sufficient make-up water has been added. Valve means for this purpose are well known in the art and do not constitute a part of the present invention. The make-up water dissolves solid sodium chloride or the like in the brine tank 28 to form the brine solution uitilized in the next regeneration cycle.

Furthermore, treated water under a relatively high pressure (greater than atmospheric pressure) enters the line 26 from the aspirator valve 20. As will be more fully explained hereinafter, the high pressure of the treated water in the line 26 causes the acid dispenser 30 to meter another predetermined amount of acid solution during the service cycle so that the acid dispenser 30 is ready to discharge this acid solution to the line 26 during the regeneration cycle. The partial vacuum or low pressure in the line 26 during the regeneration cycle actuates the acid dispenser 30 whereupon it dispenses the predetermined amount of acid solution which has been metered during the service cycle.

The main valve 12 does not constitute a part of the present invention and suitable valves for this purpose are well known in the art, e.g., the main valve disclosed in U.S. Patent No. 2,999,514, assigned to the assignee of the present application. Similarly, suitable aspirator valves 20 are well known in the art. However, it is preferred in this system to employ an aspirator valve of the type disclosed in copending applications Ser. No. 170,043, filed Jan. 31, 1962, now abandoned, and Ser. No. 191,767, filed May 2, 1962, now Patent No. 3,185,302, which are assigned to the assignee of the present application. The system may, of course, be operated manually, automatically or semi-automatically by suitable means (not shown) which do not constitute a part of the present invention.

Referring to FIGURES 2 and 3, the acid dispenser 30 embodying the features of the present invention is connected to the line 26 and comprises a container means, indicated by reference numeral 32, a liquid cartridge means, indicated generally by reference numeral 34, and a valve means, indicated generally by reference numeral 36. The container means 32 is adapted to hold the liquid cartridge means 34 which contains the acid solution and provides a determined amount of acid solution to the line 26. The valve means 36, which is actuated by the pressure in the line 26, is connected to the liquid cartridge means 34 and causes the liquid cartridge means 34 to meter a predetermined amount of acid solution to the line 26. A first port 90 on valve means 36 communicates with line 26.

The liquid cartridge means 34, as best seen in FIGURES 3, 7 and 8, comprises a plastic bag having a reservoir chamber 38 and a metering chamber 40. The reservoir chamber 38 contains the acid solution. Acid solution passes from the reservoir chamber 38 to the metering chamber 40 through second port 91 and third port 92 of the valve means 36 during the service cycle, the acid solution in the metering chamber 40 being dispensed through second port 91 and first port 90 of the valve means 36 to the line 26 during the regeneration cycle. The liquid cartridge means 34 is made of a sheet of vinyl plastic material 42, though other plastic materials and plastic-fiber materials may be used depending upon the acid solution utilized in the water softening system. The vinyl plastic sheet 42 is folded along its longitudinal axis 44 and the aligned free edges sealed by heat sealing, which is well known in the art, to form seams 45, 46, 47, 48 and 49. The reservoir chamber 38 is completed by seams 50 and 51, the latter isolating the reservoir chamber 38 from the metering chamber 40. The bottoms of the chamber 38 and 40, formed by the seams 51 and 45, respectively, slope downwardly toward inlet-outlet tubes 52 and 54 of these respective chambers. The inlet-outlet tubes 52 and 54 permit acid solution to be placed into and withdrawn from the reservoir chamber 38 and metering chamber 40, respectively, and are small vinyl plastic tubes heat sealed to the plastic sheet 42. Suitable openings (not shown) in the plastic sheet 42 permit the tubes 52 and 54 to communicate with the reservoir chamber 38 and the metering chamber 40, respectively. The reservoir chamber 38 and the metering chamber 40 are leakproof and no air or liquid may enter these chambers except through the tubes 52 and 54, respectively.

The seams 49 and 50 are traversely extending and substantially parallel to one another. Another parallel seam 56 is heat sealed between the seams 49 and 50 and forms with the seam 49 a small passageway into which a small rod 58 may be placed. The free ends of the rod 58 extend outwardly of the liquid cartridge means 34 and provide the means by which the liquid cartridge means 34 is hung in the container means 32.

The container means 32 includes an elliptically-shaped hollow body member 60 having a bottom member 62 attached thereto and a cover 64 which closes the container means 32. A hook means 66 is secured by suitable means (not shown) to the body member 60 and allows the acid dispenser 30 to be hung in any desired place, such as on the top of the brine tank.

The top of the body member 60 has two downwardly extending, opposite slots 68 therein which are adapted to receive the ends of the rod 58 so that the liquid cartridge means 34 is suspended in the container means 32 from the rod 58. The valve means 36 is mounted in the bottom 62 of the container means 32.

The liquid cartridge means 34 has its reservoir chamber 38 prefilled with acid solution. Suitable means, to be described in detail hereinafter, are employed to pass acid solution through the inlet-outlet tube 52 until the desired supply of acid solution is placed in the reservoir chamber 38. The reservoir chamber 38 is sufficiently large to hold enough acid solution for a plurality of regeneration cycles, such as 10–1,000 regeneration cycles. After the acid solution has been placed into the reservoir chamber 38, the inlet-outlet tube 52 is closed by clamps or other suitable means, one of which will be described in detail hereinafter.

The cover 64 of the container means 32 is removed. The inlet-outlet tube 52 is connected to a flexible tube 72, made of plastic or other suitable material, communicating with the valve means 36. The tubes 52 and 72 are connected by a plastic coupling member 74 or other suitable means well known in the art. The inlet-outlet tube 54 of the metering chamber 40 is similarly connected to the valve means 36. A flexible plastic tube 78 communicating with the valve 36 is attached by a plastic coupling 76 or the like to the tube 54. After the liquid cartridge means 34 has been connected to the valve means 36, the clamp or other means employed to close the inlet-outlet tube 52 is removed. The liquid cartridge means 34 is then lowered into the body member 60 of the container means 32 and hangs upon the rod 58 which fits into grooves 68. In this manner the liquid cartridge means 34 hangs freely from the rod 58 with the metering chamber 40 being below the reservoir chamber 38, as shown in FIGURE 3.

Prior to inserting the liquid cartridge means 34 into the container means 32, a spring-clip means 80 may be attached to the cartridge means 34 to reduce the volume of the metering chamber 40, if desired. In some instances the metering chamber 40 is larger than the amount of acid solution it is desired to dispense during each regeneration cycle. In such instances, the spring-clip means 80 is utilized to reduce the size of the metering chamber 40 and thereby reduce the amount of acid solution which is dispensed during each regeneration cycle.

To these ends, as best seen in FIGURES 3, 5 and 6, the spring-clip means 80 comprises a member made of spring steel or the like having a first leg 81 and a second leg 83 which are connected by an intermediate arcuate portion 85. The leg 81 has a free end 87 which forms a hook adapted to engage the free end of the leg 83. As shown in FIGURE 6 the arcuate portion 85 biases the legs 81 and 83 so that they diverge from one another as they extend outwardly from the arcuate portion 85. The metering chamber portion of the liquid cartridge means 34 is moved between the legs 81 and 83 of the spring-clip means 80. The clip means 80 is moved upwardly or downwardly to the desired position, which is determined by the amount of acid solution it is desired to use during each regeneration cycle. The legs 81 and 83 are then pressed together, the free end of the leg 83 being engaged by the hook end 87 of the leg 81. In this manner, the legs 81 and 83 press the walls 42 of the liquid cartridge means 34 together, thereby dividing the metering chamber into two non-communicating chambers. One of the chambers communicates with the tube 54 and is utilized as the metering chamber for the regeneration cycle. The position of the spring-clip means 80 therefore controls the size of the metering chamber which receives and dispenses acid solution. Accordingly, the spring-clip means 80 allows the amount of acid solution used during each regeneration cycle to be controlled.

The valve means 36 is of the type disclosed in application Serial No. 285,815, filed concurrently herewith and assigned to the same assignee as the present application, and does not constitute a part of the present invention. The valve means 36 is adapted to allow acid solution to flow from the reservoir chamber 38 through the tubes 52 and 72 into the tubes 62 and 54 and the metering chamber 40 during the service cycle while preventing acid solution from passing to the line 26. During the regeneration cycle, the valve means 36 permits the acid solution to flow from the metering chamber 40 to the line 26. To these ends the valve means 36 includes, among other things, a pressure-actuated valve member 82 to open and close a port 84 and a port 86. The port 84 allows the reservoir chamber 38 to communicate with the metering chamber 40 while the port 86 allows the metering chamber 40 to communicate with the line 26.

During the service cycle the valve means 36 is in the position shown in solid lines in FIGURE 2 by virtue of the line 26 being under a high pressure. In this position the valve member 82 closes the port 86 and opens the port 84 whereby acid solution passes by the force of gravity from the reservoir chamber 38 to the metering chamber 40 through the tubes 52 and 72, the port 84 and the tubes 78 and 54. Acid solution continues to flow into the metering chamber 40 until it is filled, the amount of acid solution required to fill the metering chamber 40 being controlled by the position of the spring-clip means 80.

When the regeneration cycle begins, the line 26 is placed under a low pressure or partial vacuum. This causes the valve means 36 to be actuated, as discussed in detail in the copending Kryzer et al. application referred to hereinbefore, causing the valve member 82 to move to its position shown in dotted lines in FIGURE 2. In this position, the port 84 is closed and the port 86 is opened and acid solution is drawn from the metering chamber 40 through the tubes 54 and 62 and the valve means 36 into the line 26 from which it travels to the resin tank 16. The flow of acid solution from the metering chamber 40 continues until the metering chamber 40 is empty.

After the regeneration cycle has been completed, the service cycle is initiated again and the cycle of the acid dispenser 30 repeated. Accordingly, during each regeneration cycle the acid dispenser 30 will discharge to the line 26 substantially the same amount of acid solution, which, of course, is determined principally by the size of the metering chamber 40 as modified by the spring-clip means 80. In this manner, the acid dispenser 30 is adapted to dispense a predetermined amount of acid solution to the line 26 in the water softening system during each regeneration cycle. When the supply of the acid solution in the reservoir chamber 38 is exhausted, the liquid cartridge means 34 is replaced or re-filled. The liquid cartridge means 34 may be replaced during the service cycle without disrupting the cycle of the water softening system.

The reservoir chamber 38 of the liquid cartridge means 34 may be prefilled directly with aqueous acid solution or by placing acid particles in the reservoir chamber 38 and subsequently adding water thereto which dissolves the acid particles to form an aqueous acid solution in the reservoir chamber 38. The latter technique is particularly advantageous when shipping a plurality of cartridge means 34, since sufficient solid acid particles to form the aqueous acid solution take up less space than the aqueous acid solution. Accordingly, more cartridge means 34 containing solid acid particles may be shipped in a given volume than cartridge means 34 prefilled with aqueous acid solution. Water is generally added to the reservoir chamber 38 containing solid acid particles just prior to the cartridge means 34 being installed in the dispenser 30.

In any event, at some time it will become necessary to add aqueous acid solution or water, or whatever other liquid is to be dispensed, to the reservoir chamber 38 through the tube 52. A funnel means, illustrated in FIGURES 9–11, embodying the features of the present invention and indicated generally by reference numeral 100 may be employed for this purpose. The funnel means 100 is, in this instance, an integral member made of plastic, metal or other suitable material. The funnel means 100 comprises a hollow conical-shaped portion 102 having a large opening 103 and a small opening 104 at its ends. An annular lip portion 106 extends axially outwardly from the opening 104 and is attached to the conical portion 102. The lip portion 106 is adapted to receive and hold an end of the tube 52 when filling the reservoir chamber 38 for reasons more apparent hereinafter. In the interior of the conical portion 102 is an axially extending, tubular portion 108 having a plurality of holes 110 whereby the interior of the conical portion 102 communicates with the opening 104. The tubular portion 108 has a free end 108a which is adapted to receive and hold the free end of the tube 52, as shown in FIGURE 11. A web 112 in the interior of the tubular portion 108 prevents communication of the free end 108a with the other end 108b of the tubular portion 108, which is attached to the conical portion 102 and communicates with the opening 104.

As shown in FIGURES 9 and 10, the annular lip portion 106 is adapted to receive and hold the free end of the tube 52 connected to the reservoir chamber 38. With the funnel member 100 in its upright position, as shown in FIGURE 9, water or aqueous acid solution may be poured into the opening 103 of the conical portion 102. The water or aqueous acid solution flows through the holes 110 in the tubular portion 108 and into the tube 52 and the reservoir chamber 38. In this manner, the funnel means 100 provides a means for easily filling the reservoir chamber 38 with aqueous acid solution, water or any other liquid. It also may be used to add solid particles to the reservoir chamber 38.

As shown in FIGURE 11, the funnel means 100 may also be utilized as a cap for the tube 52. In this instance the free end of the tube 52 is pushed into the end 108a of the tubular portion 108. The end 108a grips the end of the tube 52 and, because of the web 112, no liquid or other material may leave the tube 52.

Though the annular lip 106 and the end 108a of the tubular portion 108 have been illustrated as female sleeves cooperating with the tube 52, either or both of them may be male sleeves extending into the tube 52 and perform the same functions. The funnel means 100 may, of course, be made of a plurality of elements which are suitably attached to one another rather than being an integral member as illustrated.

Though the liquid cartridge means 34 has been illustrated as a bag containing a reservoir chamber and a metering chamber, it may comprise two bags wherein one bag is used as the reservoir chamber and the other bag is used as the metering chamber. In such a modification the reservoir chamber bag is prefilled and connected to the valve means 36 in the same manner that the reservoir chamber 38 may be prefilled and connected to the valve means 36. The reservoir chamber bag must, of course, be positioned above the metering chamber bag so that the liquid may flow from the reservoir chamber to the metering chamber. The metering chamber bag is connected to the valve means 36 in the same manner that the metering chamber 40 of the liquid cartridge means 34 is attached to the valve means 36.

Furthermore, the container 60 or the like may be utilized as the reservoir chamber and a bag of the type described hereinbefore used as the metering chamber. In this case, the valve means 36 communicates directly with the interior of the container 60 which has the acid solution therein and the tubing 72 is not required. The metering chamber bag might rest in or outside the container 60 and is connected to the valve means 36 in the same manner as the metering chamber 40 discussed hereinbefore. The level of the acid solution in the container 60 must, of course be higher than the metering chamber bag so that there will be a flow of acid solution from the reservoir chamber to the metering chamber.

It will be understood that there are a myriad of ways the liquid cartridge means, whether it be a single bag with two compartments or individual bags, may be suspended in the container 60. One such way (not shown) is to provide the cover 64 with a hook from which the cartridge means may be hung.

It will be understood that by altering the piping from the aspirator valve 20, the resin particles in the tank 16 may be contacted sequentially with acid solution and brine solution.

Though the dispenser 30 has been discussed in detail with respect to dispensing acid solutions, the dispenser and its components may be used to dispense any liquid by constructing its parts of suitable material.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. In a water softening system wherein water to be treated is contacted with ion exchange resin particles during a service cycle and said particles have their water softening capacity restored by contact with a regenerating liquid during a regeneration cycle, a regenerating liquid dispenser connected to first conduit means in said system for passing said regenerating liquid to said particles during said regeneration cycle, means for causing low pressure in said first conduit means during said regeneration cycle and high pressure in said first conduit means during said service cycle, said dispenser comprising means forming a reservoir for storing a relatively large supply of said regenerating liquid, flexible means forming a metering chamber for holding a predetermined relatively small supply of said regenerating liquid, valve means including a first port communicating with said particles through said first conduit means and a second port communicating with said metering chamber and a third port communicating with said reservoir, said valve means passing said regenerating liquid from said reservoir through said second and third ports to said metering chamber during said service cycle and from said metering chamber through said first and second ports to said first conduit means during said regeneration cycle, said flexible means being hermetically sealed except for communication of the inside thereof with said second port, means including said high pressure causing means inducing said regenerating liquid to substantially fill said metering chamber during said service cycle, and means including said low pressure causing means inducing said regenerating liquid to flow from said metering chamber during said regeneration cycle until said metering chamber is substantially empty, whereby substantially the same predetermined amount of regenerating liquid contacts said particles during each regeneration cycle.

2. The invention defined in claim 1 wherein said regenerating liquid dispenser comprises a sheet of plastic material, said sheet of plastic material having been folded along its longitudinal axis and having its free edges attached to one another to form said reservoir and said metering chamber, means separating said reservoir from said metering chamber, said reservoir being substantially larger than said metering chamber, said reservoir being completely sealed except for communicating with a first inlet-outlet tube at its bottom portion, said metering chamber being completely sealed except for communicating with a second inlet-outlet tube at its bottom portion, said first and second inlet-outlet tubes respectively being connected to said third and second ports, said dispenser when mounted in its operative position having said reservoir above said metering chamber.

3. The invention defined in claim 2 wherein said reservoir has a bottom slanting downwardly toward said first inlet-outlet tube and said metering chamber has a bottom slanting downwardly toward said second inlet-outlet tube.

4. The invention defined in claim 1 wherein said regenerating liquid dispenser comprises a sheet of plastic material, said sheet of plastic material having been folded along its longitudinal axis and having its free edges attached to one another to form a reservoir and a metering chamber, means separating said reservoir from said metering chamber, said reservoir being substantially larger than said metering chamber, said reservoir being completely sealed except for communicating with a first inlet-outlet tube at its bottom portion, said metering chamber being completely sealed except for communicating with a second inlet-outlet tube at its bottom portion, and means to divide said metering chamber into two chambers comprising a member having a first leg portion and a second leg portion, said leg portions being connected by a spring portion, said leg portions each having a free end, said free ends tending to move away from one another by the action of said spring portion, said free end of said first leg portion adapted to engage said free end of said second leg portion, said plastic material being compressed between said leg portions, said leg portions thereby dividing said metering chamber into two chambers.

5. In a water softening system wherein water to be treated is contacted with ion exchange resin particles during a service cycle and said particles have their water softening capacity restored by contact with a regenerating liquid during a regeneration cycle, a regenerating liquid dispenser connected to first conduit means in said system for passing said regenerating liquid to said particles during said regeneration cycle, means for causing low pressure in said first conduit means during said regeneration cycle and high pressure in said first conduit means during said service cycle, said dispenser comprising a closed container for storing a relatively large supply of said regenerating liquid, a flexible plastic bag forming a metering chamber for holding a predetermined relatively small supply of said regenerating liquid, liquid in said closed container being above said metering chamber, valve means having a first port communicating with said particles through said first conduit means and a second port communicating with said metering chamber and a third port communicating with said container, said valve means passing said regenerating liquid from said container to said metering chamber during said service cycle and from said metering chamber to said first conduit means during said regeneration cycle, said flexible bag being hermetically sealed except for communication of the inside thereof with said second port, means including said high pressure causing means inducing said regenerating liquid to substantially fill said metering chamber during said service cycle, and means including said low pressure causing means inducing said regenerating liquid to flow from said metering chamber during said regeneration cycle until said metering chamber is substantially empty, whereby substantially the same predetermined amount of regenerating liquid contacts said particles during each regeneration cycle.

References Cited by the Examiner
UNITED STATES PATENTS

| | | | |
|---|---|---|---|
| 1,444,030 | 2/1923 | Leather | 24—259.1 |
| 1,488,864 | 4/1924 | Canaday | 24—30.5 |
| 1,870,014 | 5/1951 | Laughton | 24—259.1 |
| 2,554,570 | 5/1951 | Harvey | 222—444 X |
| 2,565,045 | 8/1951 | Ray | 222—444 X |
| 2,668,637 | 2/1954 | Gilmore | 222—207 X |
| 2,838,208 | 6/1958 | Levit | 222—453 X |
| 2,861,718 | 11/1958 | Winzen | 229—14 |
| 3,112,047 | 11/1963 | Weinreich et al. | 229—14 |
| 3,141,574 | 7/1964 | Donoghue | 222—207 X |
| 3,176,876 | 4/1965 | Fischer et al. | 222—440 X |
| 3,216,931 | 11/1965 | Dennis et al. | 210—190 X |

REUBEN FRIEDMAN, *Primary Examiner.*

C. M. DITLOW, *Assistant Examiner.*